US00RE40671E

(19) United States
(12) Reissued Patent
Wurz et al.

(10) Patent Number: US RE40,671 E
(45) Date of Reissued Patent: Mar. 24, 2009

(54) GAMING MACHINE

(75) Inventors: Norman R. Wurz, Des Plaines, IL (US); James M. Rasmussen, Chicago, IL (US); William C. Cesaroni, Glenview, IL (US); Robert J. Glenn, III, Elk Grove Village, IL (US); Jack B. Hough, Arlington Heights, IL (US)

(73) Assignee: WMS Gaming Inc., Waukegan, IL (US)

(21) Appl. No.: 29/267,723

(22) Filed: Oct. 18, 2006

Related U.S. Patent Documents

Reissue of:
(64) Patent No.: Des. 459,402
Issued: Jun. 25, 2002
Appl. No.: 29/147,267
Filed: Aug. 24, 2001

U.S. Applications:
(63) Continuation of application No. 29/236,160, filed on Aug. 11, 2005, which is a division of application No. 29/193,474, filed on Jul. 28, 2003, now abandoned, which is a continuation-in-part of application No. 09/441,125, filed on Nov. 17, 1999, now Pat. No. 6,334,612.

(51) LOC (9) Cl. ..... 21-01
(52) U.S. Cl. ..... D21/325; D21/369
(58) Field of Classification Search ..... D21/324–327, D21/333, 369, 370, 371; 463/1, 2, 13, 18, 463/19, 20, 46, 47, 29–35, 50–52; 273/148 B, 273/143 R; 482/901, 902; 343/3, 4; D20/1, D20/2, 4, 8
See application file for complete search history.

(56) References Cited

U.S. PATENT DOCUMENTS

| | | | | | |
|---|---|---|---|---|---|
| D315,110 | S | * | 3/1991 | Slater | D10/88 |
| 5,411,257 | A | | 5/1995 | Fulton | 273/85 |
| 5,820,460 | A | | 10/1998 | Fulton | 463/13 |
| D419,606 | S | | 1/2000 | Toriyama | D21/325 |
| 6,047,963 | A | * | 4/2000 | Pierce et al. | 273/121 B |
| D428,062 | S | | 7/2000 | Hayashi | D21/325 |
| 6,102,394 | A | * | 8/2000 | Wurz et al. | 273/138.2 |
| 6,117,010 | A | * | 9/2000 | Canterbury et al. | 463/20 |
| D446,252 | S | | 8/2001 | Yamaguchi | D21/325 |
| 6,290,229 | B1 | | 9/2001 | Perez | 273/148 |
| D450,094 | S | * | 11/2001 | Hedrick et al. | D21/369 |
| 6,334,612 | B1 | * | 1/2002 | Wurz et al. | 273/143 R |
| D464,377 | S | * | 10/2002 | Wurz et al. | D21/369 |
| 6,589,114 | B2 | * | 7/2003 | Rose | 463/20 |
| D508,268 | S | * | 8/2005 | Hanchar et al. | D21/369 |
| D508,269 | S | * | 8/2005 | Wichinsky | D21/369 |
| D509,254 | S | * | 9/2005 | Rasmussen et al. | D21/369 |
| 7,184,277 | B2 | * | 2/2007 | Beirne | 361/807 |
| D539,854 | S | * | 4/2007 | Luciano et al. | D21/369 |

* cited by examiner

*Primary Examiner*—Prabhakar Deshmukh
(74) *Attorney, Agent, or Firm*—Nixon Peabody LLP

(57) CLAIM

The ornamental design for a "gaming machine", as shown and described.

DESCRIPTION

FIG. 1 is an isometric view of a gaming machine showing our new design.
FIG. 2 is a front elevational view thereof.
[FIG. 3 is a rear elevational view thereof.]
FIG. [4] *3* is a left side elevational view thereof.
FIG. [5] *4* is a right side elevational view thereof.
[FIG. 6 is a top plan view thereof.]
[FIG. 7 is a bottom plan view thereof.]
The broken lines shown are for illustrative purposes only and form no part of the claimed design.

1 Claim, 4 Drawing Sheets

Figure 6:
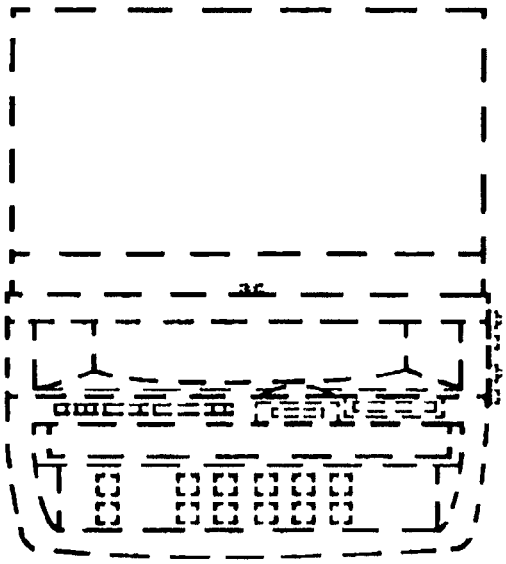
Figure 7:
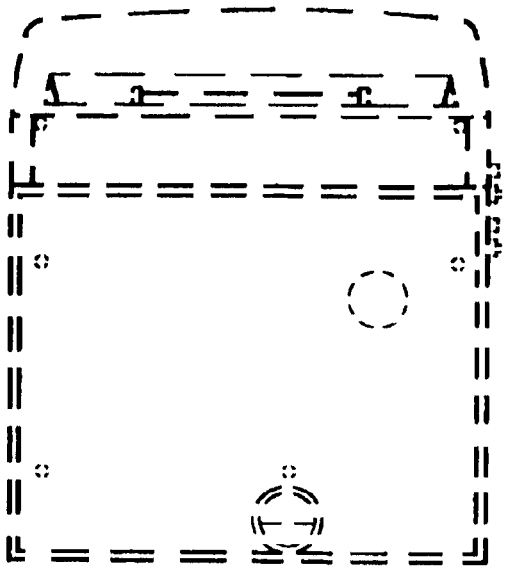

Matter enclosed in heavy brackets [ ] appears in the original patent, but forms no part of this reissue; matter printed in italics indicates the additions made by reissue.

(Amended)

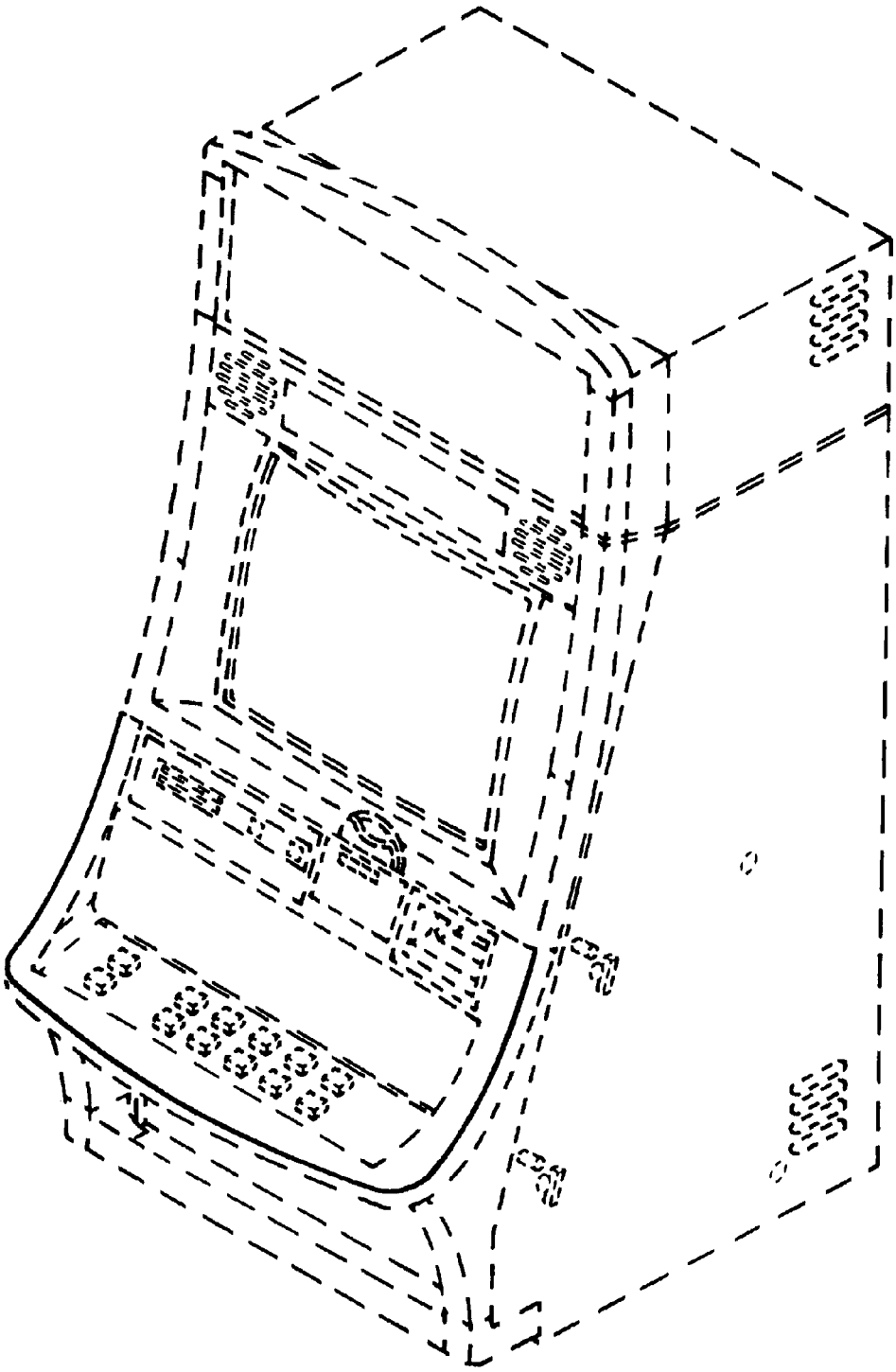
Fig. 1
(Amended)

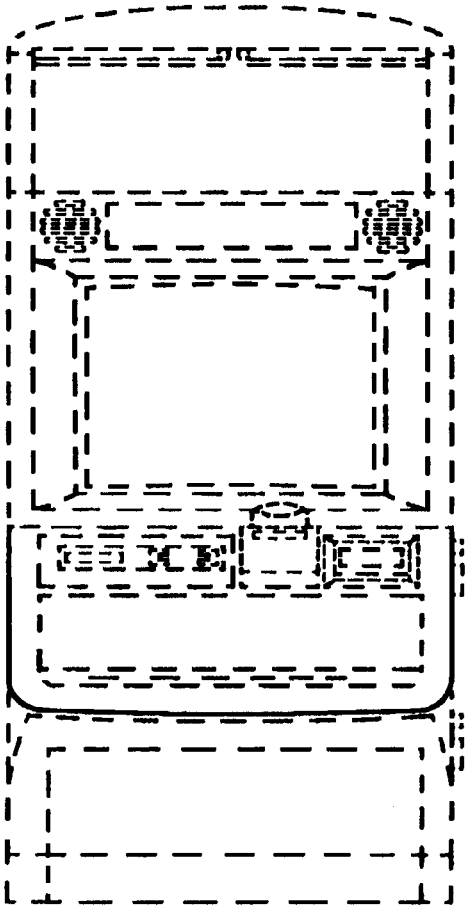
Fig. 2
(Amended)
Fig. 3
(Cancelled)
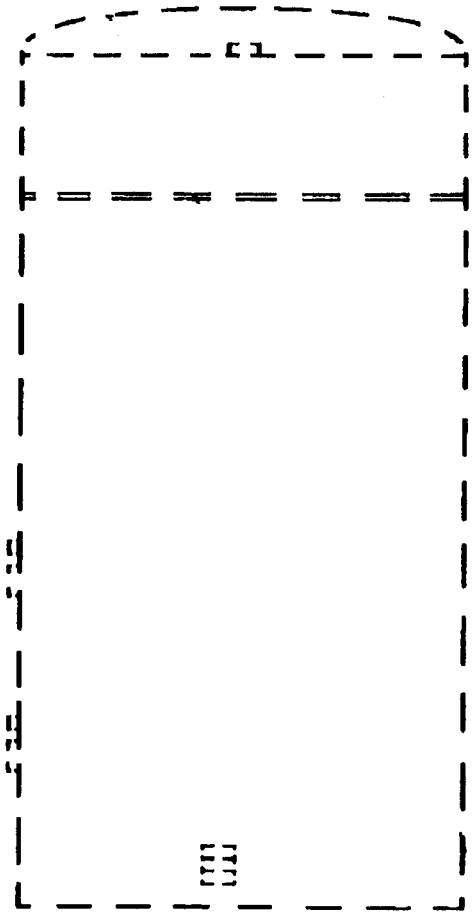

Fig. 3
(Amended)
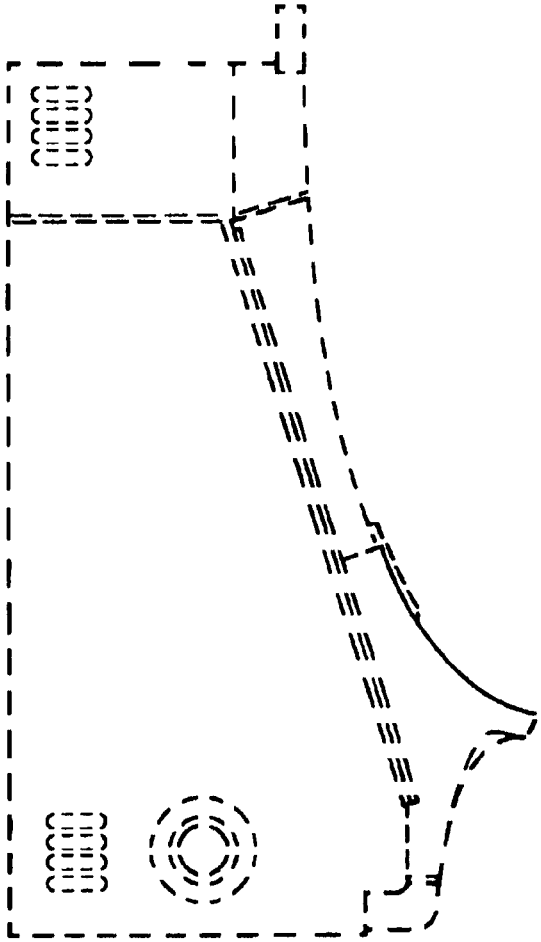
Fig. 4
(Amended)
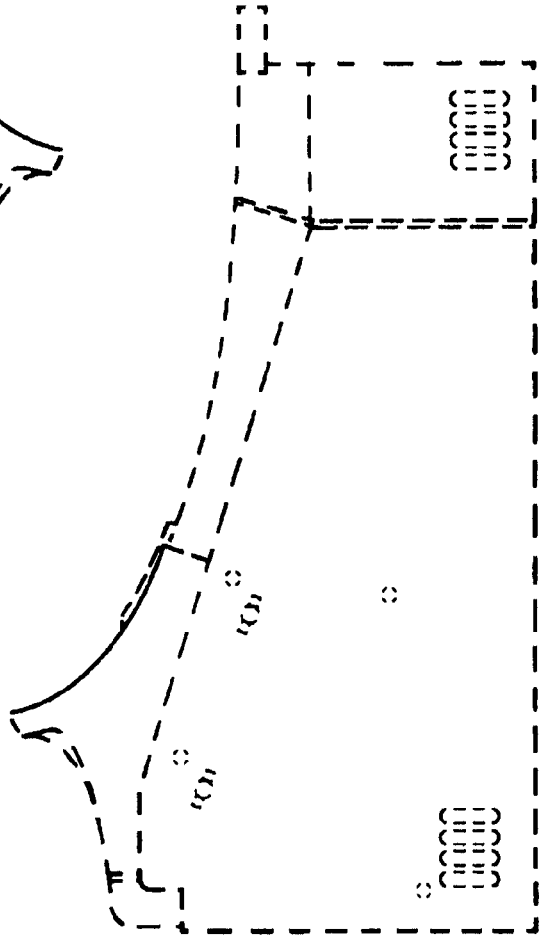

(Cancelled)

(Cancelled)